(12) United States Patent
Chang et al.

(10) Patent No.: US 6,807,141 B2
(45) Date of Patent: Oct. 19, 2004

(54) PLANAR INTEGRATED MICRO-OPTICAL PICKUP HEAD INCLUDING TWO PLANAR CYLINDRICAL COLLIMATORS

(75) Inventors: Chi-Lone Chang, Hsin-Chu Hsien (TW); Hsi-Fu Shih, Chang-Hua Hsien (TW); Yuan-Chin Lee, Hsin-Chu (TW); Chau-Yuan Ke, Ping-Tung Hsien (TW); Dai-Tin Huang, Hsin-Chu (TW); Jau-Jiu Ju, Hsin-Chu Hsien (TW)

(73) Assignee: Industrial Technology Research, Hsin-Chu Hsien (TW)

( * ) Notice: Subject to any disclaimer, the term of this patent is extended or adjusted under 35 U.S.C. 154(b) by 356 days.

(21) Appl. No.: 10/022,446

(22) Filed: Dec. 20, 2001

(65) Prior Publication Data

US 2003/0095493 A1 May 22, 2003

(30) Foreign Application Priority Data

Nov. 21, 2001 (TW) ........................................ 90128770 A

(51) Int. Cl.[7] ................................................. G11B 7/00
(52) U.S. Cl. ............................... 369/112.26; 369/13.33; 369/13.34
(58) Field of Search ........................ 369/112.24, 112.25, 369/112.26, 13.33, 13.13, 13.34

(56) References Cited

U.S. PATENT DOCUMENTS

| | | | | |
|---|---|---|---|---|
| 4,789,977 A | * | 12/1988 | Oudenhuysen et al. | 369/112.1 |
| 5,218,461 A | * | 6/1993 | Aoyama et al. | 358/471 |
| 5,220,476 A | * | 6/1993 | Godwin et al. | 360/60 |
| 5,572,367 A | * | 11/1996 | Jung et al. | 359/708 |
| 5,646,928 A | * | 7/1997 | Wu et al. | 369/112.24 |
| 5,886,971 A | * | 3/1999 | Feldman et al. | 369/112.05 |
| 5,972,461 A | * | 10/1999 | Sandstrom | 428/64.3 |
| 6,128,134 A | * | 10/2000 | Feldman et al. | 359/565 |
| 6,430,331 B1 | * | 8/2002 | Hagelin et al. | 385/17 |
| 6,529,449 B1 | * | 3/2003 | Jordan et al. | 369/13.33 |
| 6,545,969 B1 | * | 4/2003 | Berg et al. | 369/112.23 |

FOREIGN PATENT DOCUMENTS

JP    09113769 A  *  5/1997  ............ G02B/6/42

* cited by examiner

Primary Examiner—Gautam R. Patel
(74) Attorney, Agent, or Firm—Bacon & Thomas, PLLC

(57) ABSTRACT

A planar integrated micro-optical pickup head is used to perform reading and writing operations on a high-density disk. The planar integrated micro-optical pickup head includes a set of optical elements that is comprised of a beam splitter, a plurality of 45-degrees-oriented folding mirrors, and two planar collimators. The pickup head further comprises a photo-detector, a laser source for emitting a laser beam of short wavelength, and an objective lens of high value of numerical aperture. The set of optical elements is formed on lower and upper substrates via semiconductor planar fabrication processes, the laser source and the objective lens then are mechanically attached on the lower substrate. The lower and upper substrates are ultimately aligned and attached with each other to achieve the pickup head hence having a reduced size and simply fabricated.

8 Claims, 17 Drawing Sheets

US 6,807,141 B2

PLANAR INTEGRATED MICRO-OPTICAL PICKUP HEAD INCLUDING TWO PLANAR CYLINDRICAL COLLIMATORS

FIELD OF THE INVENTION

The invention relates to an optical pickup head. More particularly, the invention provides a pickup head that can be manufactured via semiconductor planar fabrication processes so that the size of the pickup head can be reduced while it can be used to read and write on high-density disks.

BACKGROUND OF THE INVENTION

The function of an optical head is to focus a laser beam emitted from a laser source into a focus spot on a data layer of the disk and further precisely maintain this focus spot to perform reading, writing, and erasing operations on the disk.

Referring to FIG. 1, a schematic view illustrates an operation of a conventional optical pickup head. When a reading operation is performed, a laser beam emitted from a laser source 1 diverges along the light path 2A onto a beam splitter 3. A portion of the laser beam then is reflected toward a collimator 4 to become parallel. Via a folding mirror 5, the horizontal laser beam then is upwardly reflected toward an objective lens 6 to be focused and projected onto a disk 7. After reflection from the disk 7, the laser beam passes through the objective lens 6, the folding mirror 5, and the collimator 4 to the beam splitter 3. A portion of the laser beam passes through the beam splitter and travels along the light path 2B toward a photo-detector 8. The photo-detector 8 then converts the light signal into an electrical signal that includes data signal from the disk, focus error signal, and track course error signal. The focus error signal and the track course error signal are processed via a server circuit. Subsequently, a resulting feedback current is delivered to a controller coil 9 of the objective lens 6 and a track course controller coil 10 to correct the focus error and the track course error. Thereby, a reading operation of the disk is correctly performed without error signals.

When a writing operation is performed, a function generator adjusts a driving current of the laser source 1 to obtain a desired variation of intensity of the laser beam. Resulting thermal actions of the laser beam, travelling through the above light path to be projected onto the disk, then create different physical features of the data layer of the disk corresponding to the data information written. An erasing operation is similar to the above writing operation except that the intensity of the laser beam is appropriately adjusted to create similar physical features on the data layer of the disk to achieve an erasure.

FIG. 2 is a perspective view that illustrates a conventional optical pickup head that operates according to the above mechanism. In the conventional optical pickup head, the beam splitter 3, the collimator 4, the folding mirror 5, and the objective lens 6 are mechanically constructed via a precise casting process, and are subsequently attached onto an element support base 11. Usually, the element support base 11 also requires a precise casting process to be fabricated. The laser source 1 and the photo-detector 8 are further attached onto side faces of the element support base 11.

Because the above elements are solid and spatially distributed on the element support base 11, the size of the optical pickup head therefore is not easily reduced. Furthermore, in the assembly stage, the mount of the above optical elements necessitates a precise positioning. As a result, the fabrication of the conventional optical pickup head is complicated to achieve and provides a low yield.

SUMMARY OF THE INVENTION

It is therefore a principal object of the invention to provide a planar integral micro-optical pickup head that can overcome the above difficulties of mechanical precise processes, precise positioning and assembly.

It is another object of the invention to provide a planar integral micro-optical pickup head that can be fabricated via semiconductor planar fabrication processes and simple alignment and attachment operations so that the size of the optical pickup head can be miniaturized.

Yet, it is another object of the invention to provide an optical pickup head that can read and write on high-density disks.

BRIEF DESCRIPTION OF THE DRAWINGS

The drawings included herein provide a further understanding of the invention and, incorporated herein, constitute a part of the invention disclosure. A brief introduction of the drawings is as follows.

DESCRIPTION OF THE PREFERRED EMBODIMENTS

First Embodiment

Figure 1:
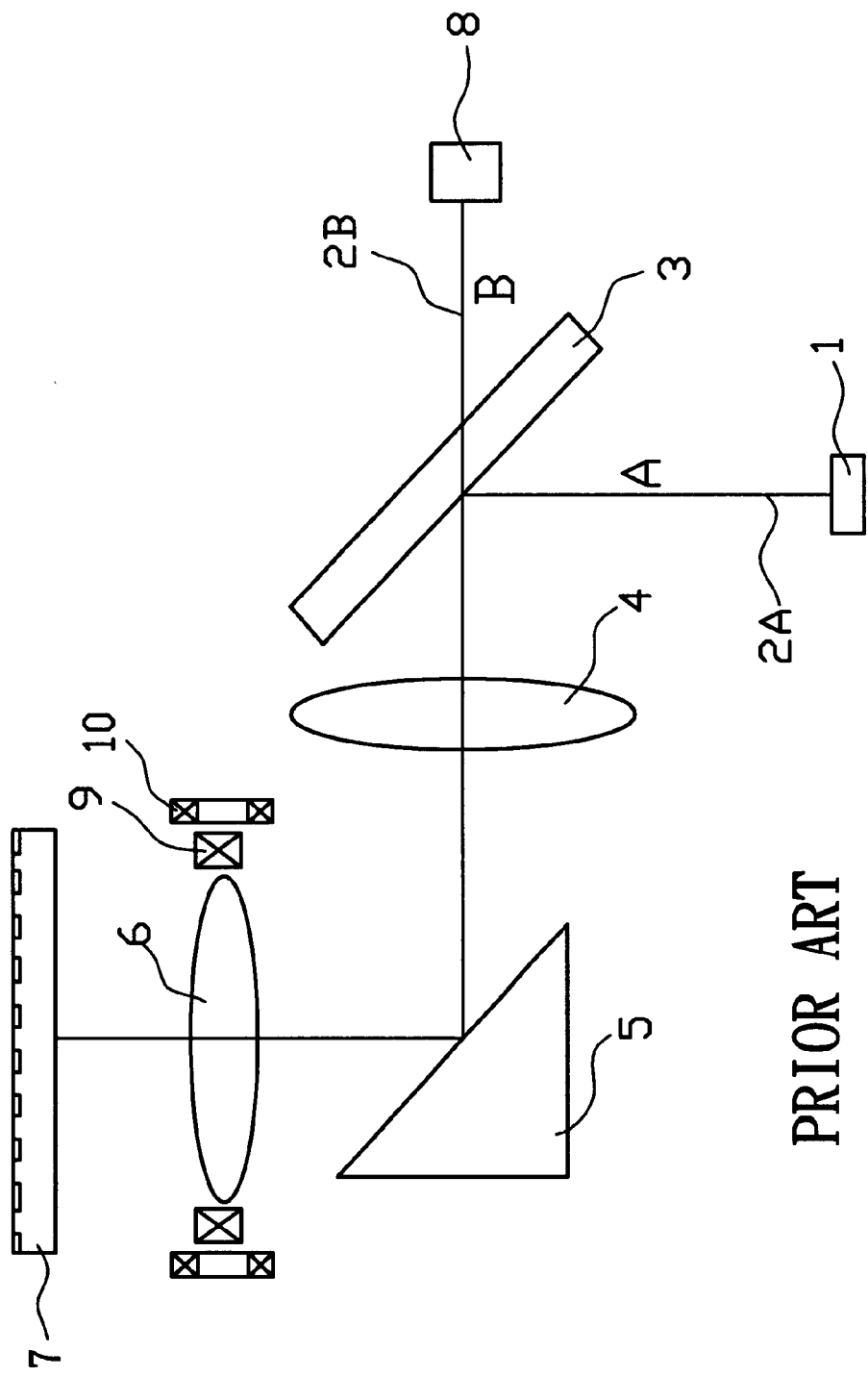
FIG. 1 is a schematic view showing a light path within a conventional optical pickup head.
Figure 2:
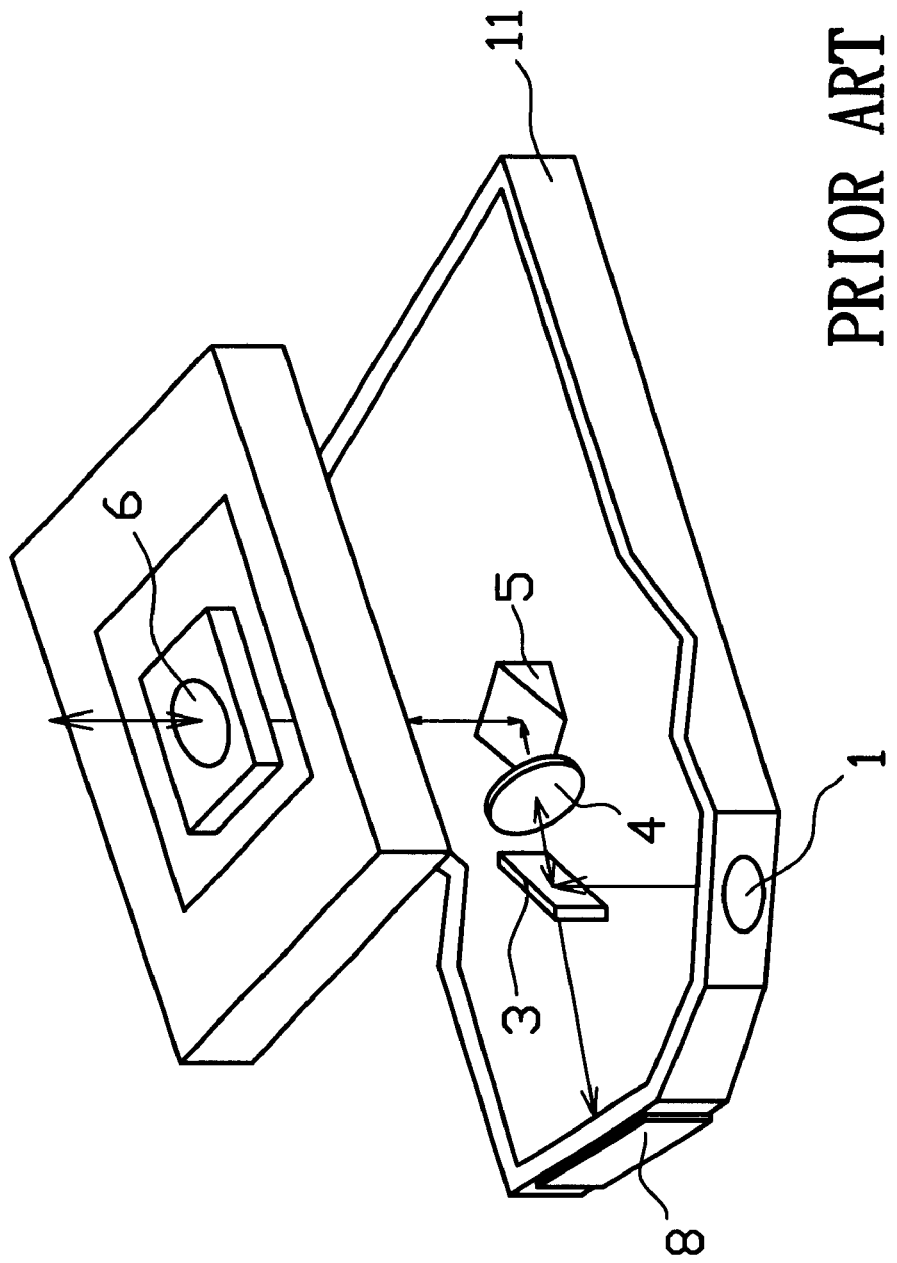
FIG. 2 is a perspective view that schematically illustrates a conventional optical pickup head.
Figure 3:
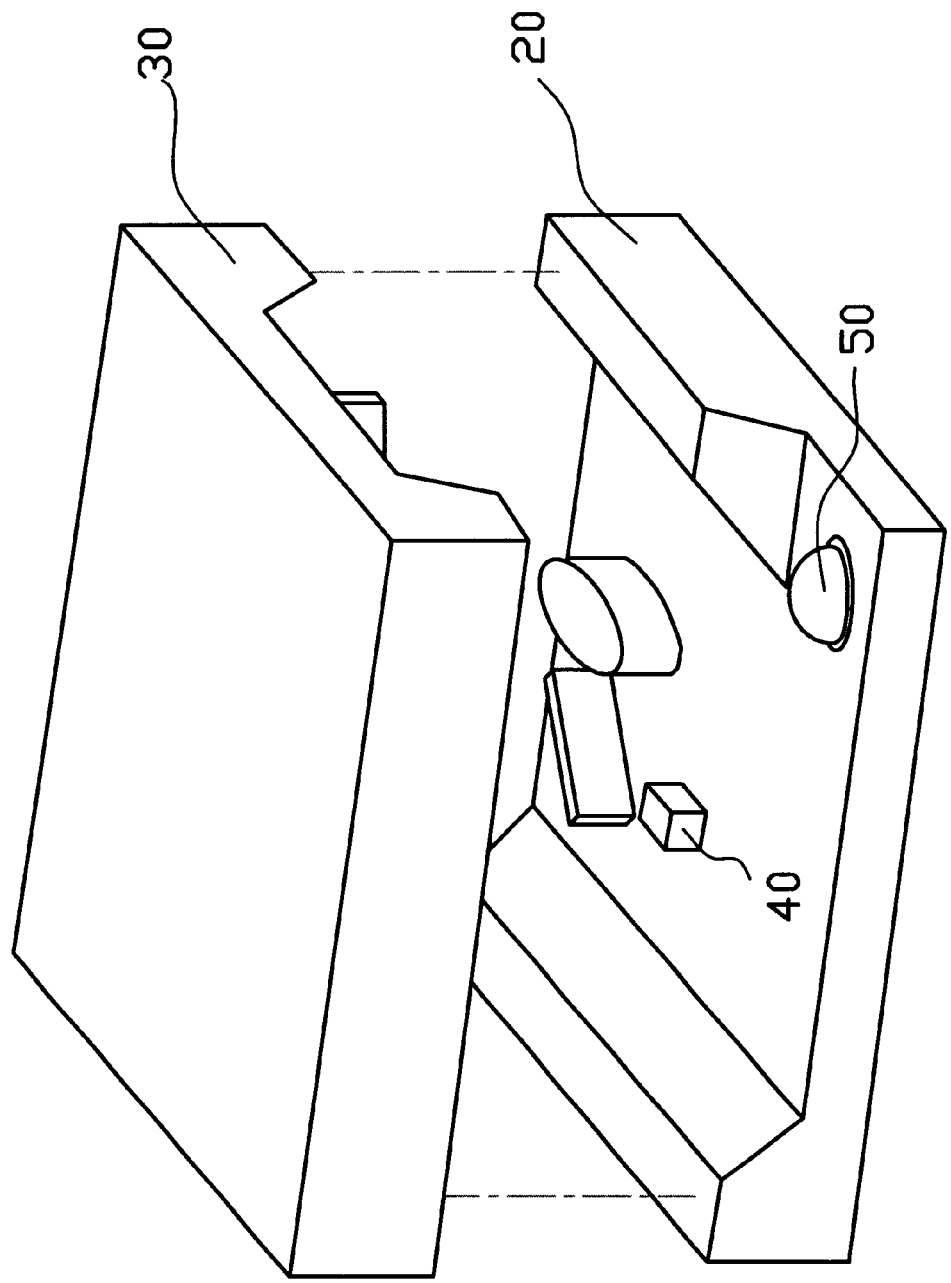
FIG. 3 is a perspective view that schematically illustrates a planar integral micro-optical pickup head according to a first embodiment of the invention.

Referring to FIG. 3, a perspective view schematically illustrates a planar integrated micro-optical pickup head according to a first embodiment of the invention. The planar integrated micro-optical pickup head principally performs data reading and data writing operations on an optical disk. The planar integrated micro-optical pickup head comprises an optical assembly formed of a lower substrate 20 and an upper substrate 30, a laser source 40, and an objective lens 50.

Figure 4:
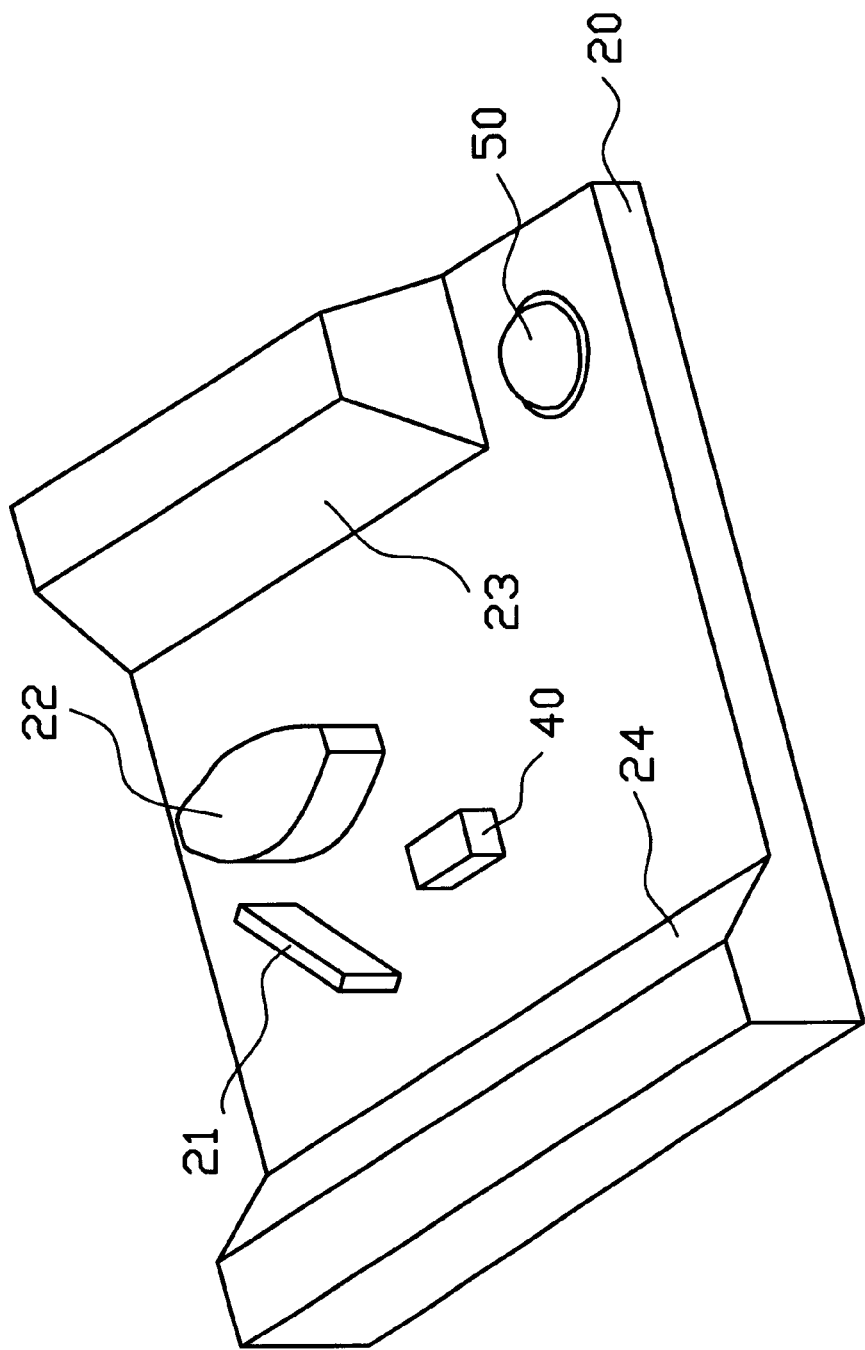
FIG. 4 is a perspective view of a lower substrate according to the first embodiment of the invention.

Referring to FIG. 4, a perspective view schematically illustrates a lower substrate according to the first embodiment of the invention. The lower substrate 20 supports a beam splitter 21, a first planar collimator 22, a first folding mirror 23, and a fourth folding mirror 24. The above elements supported on the lower substrate 20 are formed via a semiconductor planar fabrication process.

Figure 5:
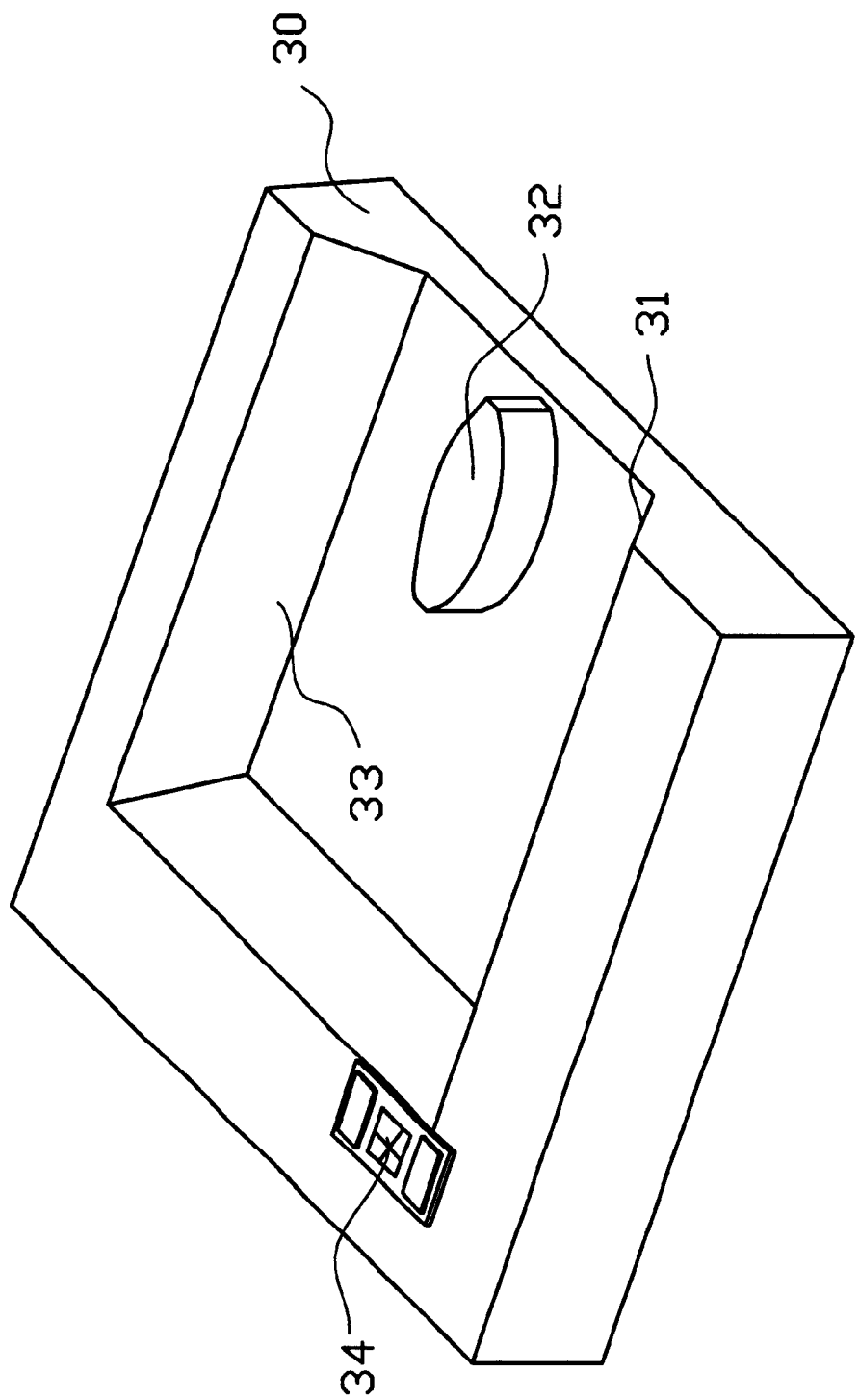
FIG. 5 is a perspective view of an upper substrate according to the first embodiment of the invention.

Referring to FIG. 5, a perspective view schematically illustrates an upper substrate according to the first embodiment of the invention. The upper substrate 30 supports a second folding mirror 31, a second planar collimator 32, a third folding mirror 33, and a photo-detector 34. The above elements supported on the upper substrate 30 are formed via a semiconductor planar fabrication process. The laser source 40 is mechanically fixedly attached at an appropriate location of the lower substrate 20 to provide a laser beam of short wavelength. The objective lens 50 is mechanically fixedly attached at an appropriate location on the lower substrate 20. The location of the objective lens 50 on the lower substrate 20 is defined by a cylindrical opening formed via a semiconductor planar fabrication process. A planar integrated micro-optical pickup head is hence constructed from the above component parts.

Figure 6A:
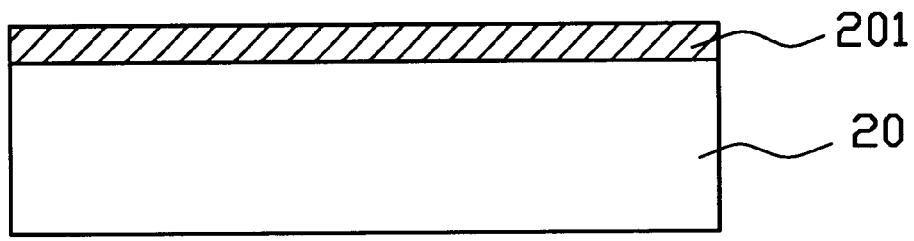
FIG. 6A through FIG. 6G are various cross-sectional views that schematically illustrate various stages in a progression of the fabrication of the lower substrate according the first embodiment of the invention.
Figure 6B:
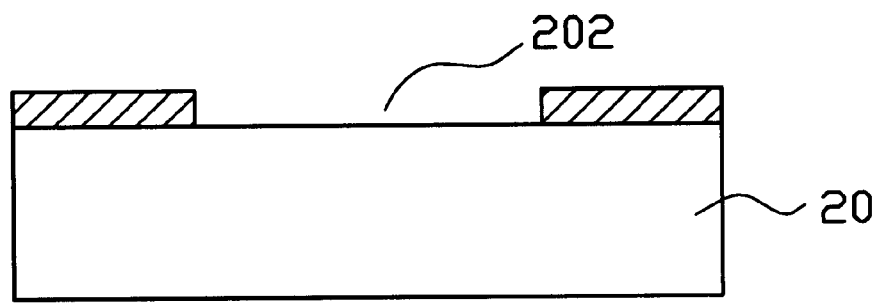
Figure 6C:
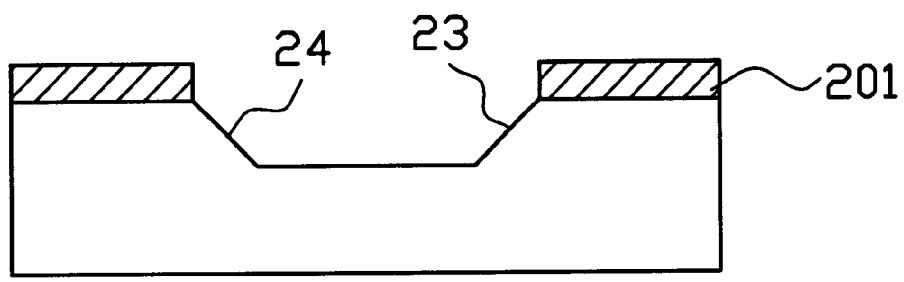
Figure 6D:
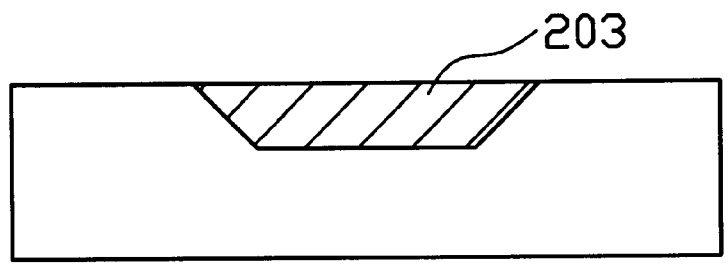
Figure 6E:
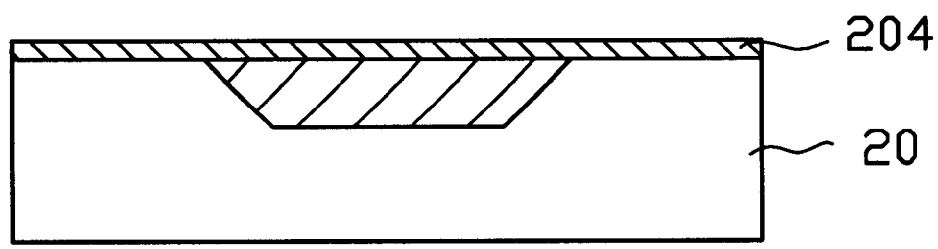
Figure 6F:
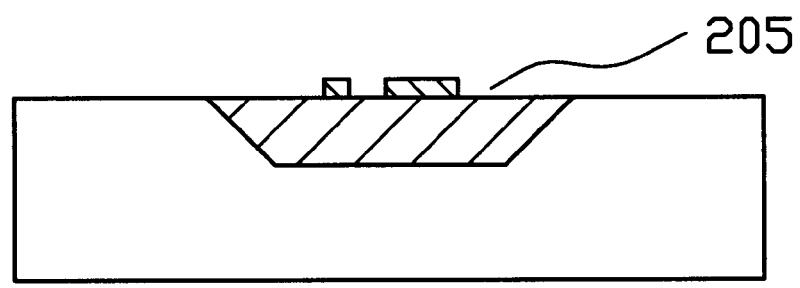
Figure 6G:
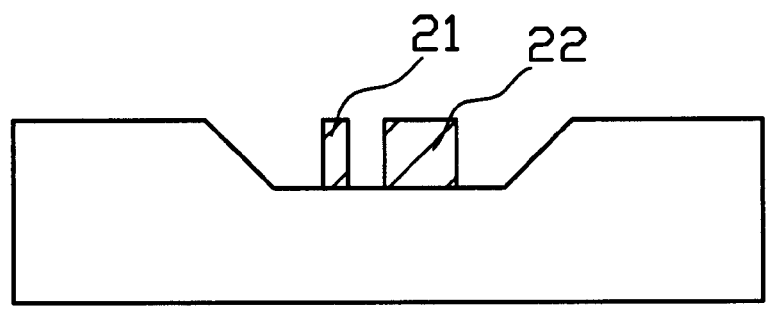

Referring now to FIG. 6A through FIG. 6G, various cross-sectional views schematically illustrate various stages in a progression of the fabrication of the lower substrate 20 according to the first embodiment of the invention. As shown in FIG. 6A, a first photoresist layer 201 is formed on the lower substrate 20 that is made of silicon. Via a patterned photomask, a first opening window 202 is formed through the first photoresist layer 201. An anisotropic etching then is performed through the first opening window 202 to form a first well 203 with 45-degrees-oriented first and fourth folding mirrors 23, 24 (see FIG. 6C). The first photoresist layer 201 then is removed, and silicon nitride (SiN) or silicon dioxide (SiO2) is deposited in the first well 203, followed by a planarization process (see FIG. 6D). A second photoresist layer 204 is formed on the lower substrate 20 (see FIG. 6E). A second opening window 205 is formed through the second photoresist layer 204 via photolithography and etching processes (see FIG. 6F). An anisotropic etching then is performed to form the beam splitter 21 and the first planar collimator 22 (see FIG. 6G).

Figure 7A:
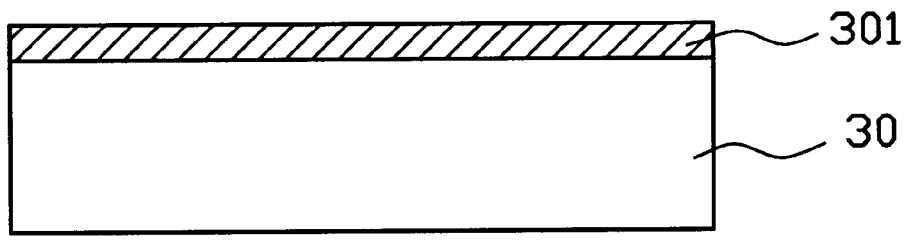
FIG. 7A through FIG. 7H are various cross-sectional views that schematically illustrate various stages in a progression of the fabrication of the upper substrate according the first embodiment of the invention.
Figure 7B:
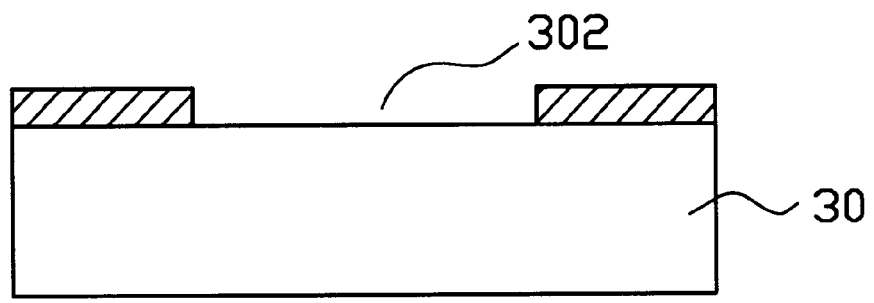
Figure 7C:
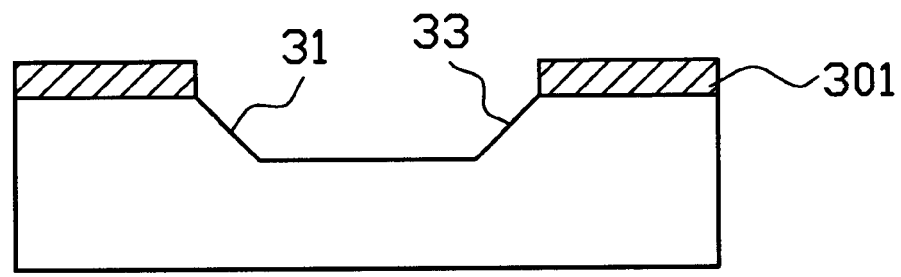
Figure 7D:
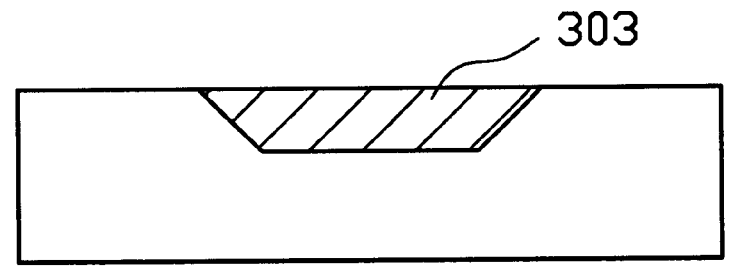
Figure 7E:
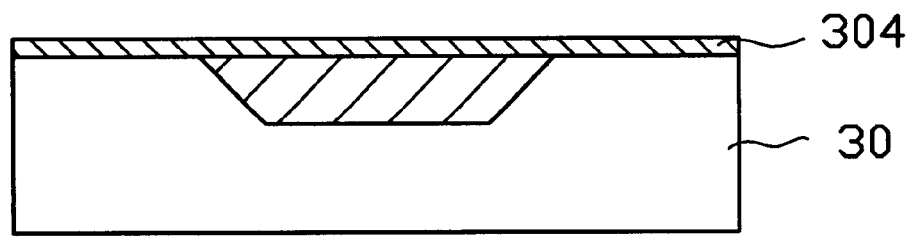
Figure 7F:
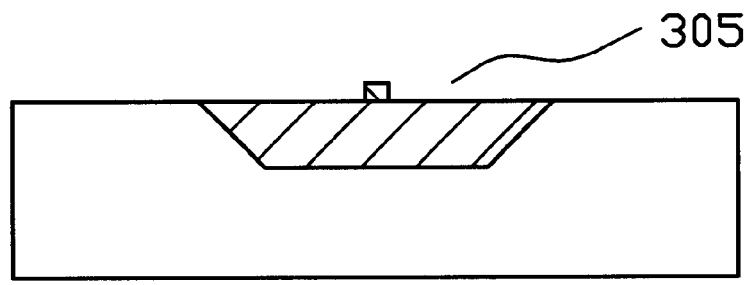
Figure 7G:
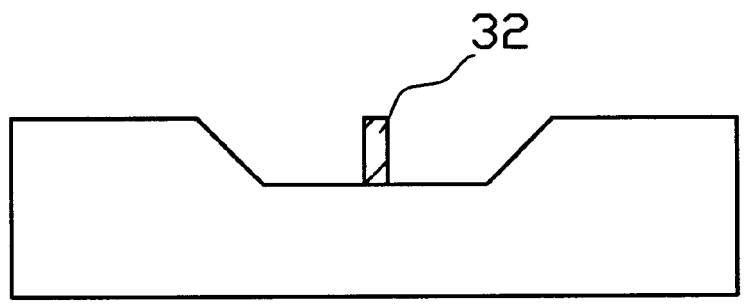
Figure 7H:
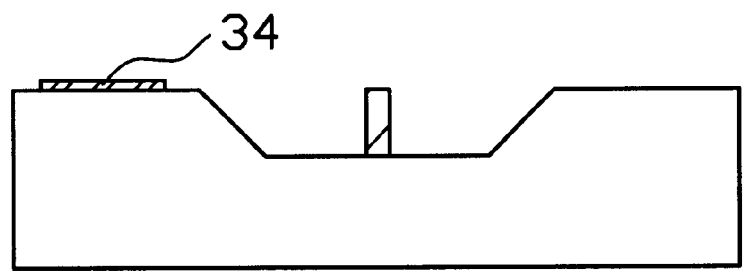

Referring to FIG. 7A through FIG. 7H, various cross-sectional views schematically illustrate various stages in a progression of the fabrication of the upper substrate 20 according to the first embodiment of the invention. As shown in FIG. 7A, a third photoresist layer 301 is formed on the upper substrate 30 that is made of silicon. A third opening window 302 is formed through the third photoresist layer 301 (see FIG. 7B). An anisotropic etching is performed through the first opening window 202 to form a second well 303 with 45-degrees-oriented second and third folding mirrors 31, 33 (see FIG. 7C). The third photoresist layer 301 then is removed, and SiN or SiO2 is deposited in the second well 303, followed by a planarization process (see FIG. 7D). A fourth photoresist layer 304 is formed on the upper substrate 30 (see FIG. 7E). A fourth opening window 305 then is formed through the fourth photoresist layer 304 (see FIG. 7F). An anisotropic etching then is performed to form the second planar collimator 32 (see FIG. 7G). The photo-detector 34 then is formed via an epitaxial growth, an etching, and an ion implantation (see FIG. 7H).

FIG. 3 is a perspective view that schematically illustrates the assembly of the planar integrated micro-optical pickup head of the invention. After the lower substrate 20 and the upper substrate 30 are achieved, the laser source 40 and the objective lens 50 are mechanically fixedly attached on the lower substrate 20. The upper substrate 30 is ultimately aligned and attached with the lower substrate 20. Via semiconductor planar fabrication processes, and simple alignment and attachment operations, the planar integrated micro-optical pickup head of the invention can be therefore miniaturized while its manufacture is simpler and provides a good yield. Alternatively, injection molding can be performed to first mold the lower and upper substrates 20, 30, and a photo-detector, a laser source, and an objective lens may be then bonded on the lower substrate 20. The casting material used may be polymer or glass.

Figure 8:
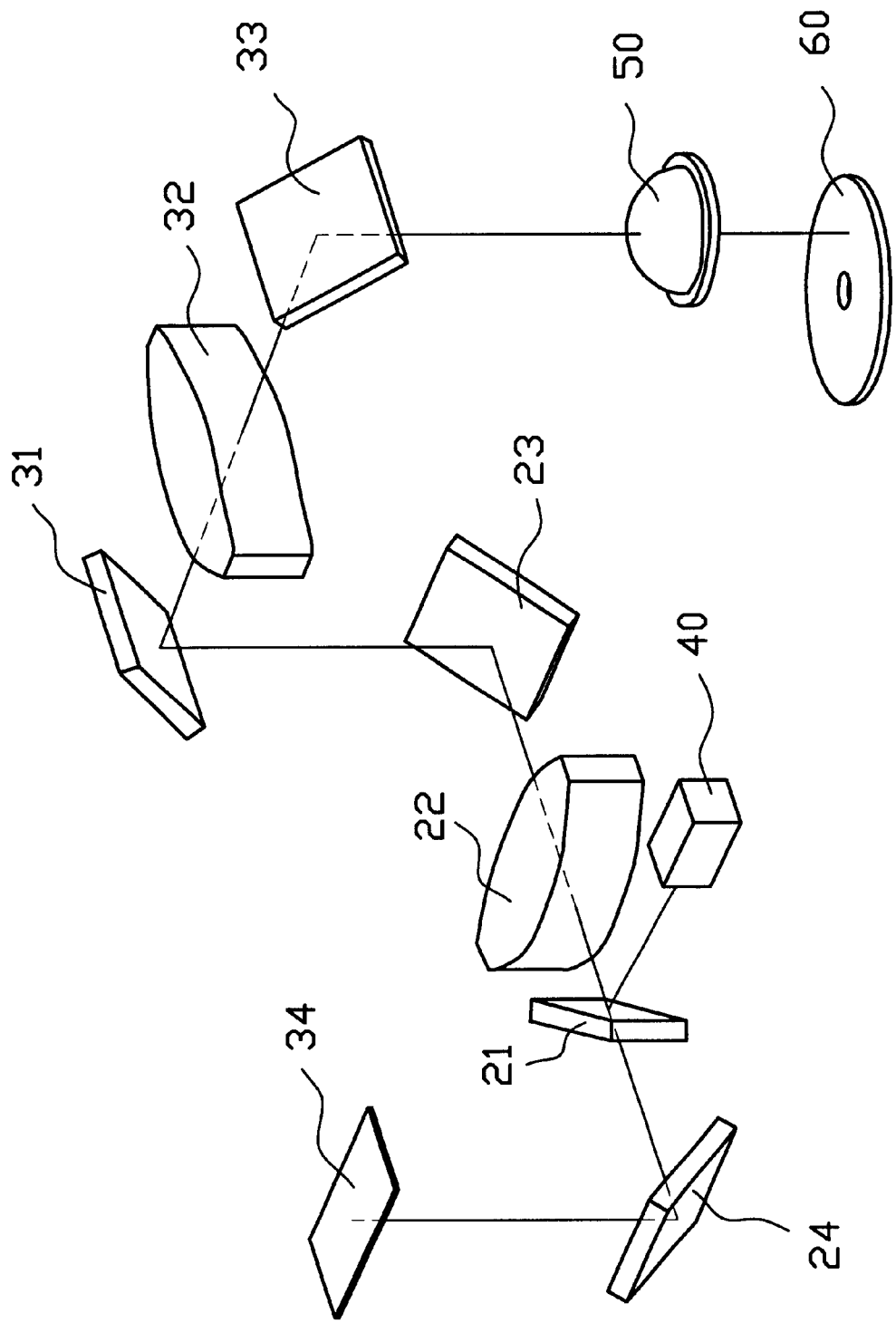
FIG. 8 is a schematic view showing a light path within a planar integral micro-optical pickup head according to the first embodiment of the invention.

Referring now to FIG. 8, a perspective view schematically illustrates a light path within the planar integrated micro-optical pickup head according to the first embodiment of the invention. When a reading operation is performed, the laser source 40 emits an oval laser beam of short wavelength. The laser beam passes through the beam splitter 21 and is reflected toward the first planar collimator 22 on the right side, turns 90 degrees after reflections on the first folding mirror 23 and the second folding mirror 31, travels through the second planar collimator 32, and is reflected toward the objective lens 50 to be finally focused on a data layer of the optical disk 60. In the above light path, once having passed through the first planar collimator 22, the light of the oval laser beam becomes parallel along its long axis while the light of the oval laser beam continues diverging along its short axis. Once having passed through the second planar collimator 32, the light of the laser beam is also parallel along its short axis to obtain a circular laser beam with uniform power distribution. An effective collimation is thereby obtained through the two planar collimators 22, 32.

In the return light path, after reflection from the optical disk 60 toward the beam splitter 21, a portion of the laser beam then travels through the beam splitter 21, and is reflected by the fourth folding mirror 24 into the photo-detector 34. The photo-detector 34 then converts the light signal (including disk data signals, focus error signals, etc.) into an electrical signal.

When a writing operation is performed, the above reading mechanism is first accomplished to find the location of the optical disk 60 where data should be written. By means of a function generator, a driving current of the laser source 40 then is adjusted to have a required variation of intensity of the laser beam. Through the above light path of the reading operation, the laser beam is focused on the data layer of the optical disk 60. Thermal actions generated by the variation of intensity of the laser beam then create different physical features on the data layer of the optical disk 60 corresponding to binary data 0 and 1. An erasure operation is very similar to the writing operation, the principal difference is that the thermal actions generated by the laser beam result in identical physical features of the data layer of the optical disk 60 to accomplish an erasure operation.

Figure 9:
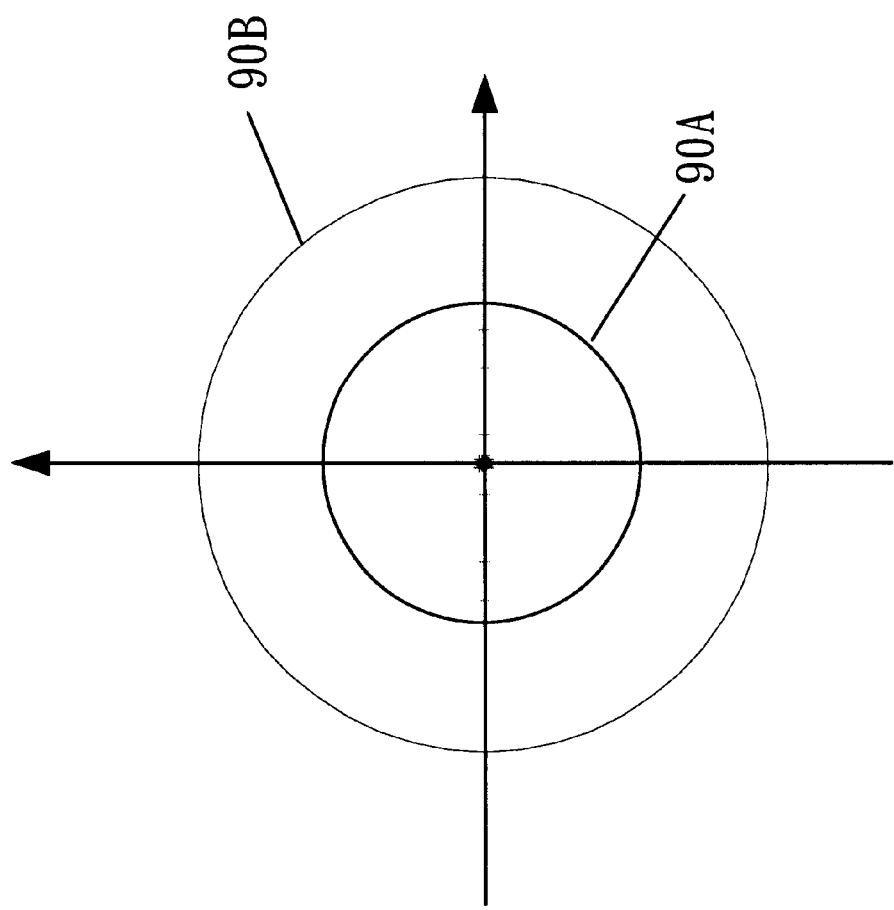
FIG. 9 is a chart showing a distribution of the spot size on a disk obtained with the planar integral micro-optical pickup head of the invention.

Via reducing the wavelength of the laser beam and increasing the value of the numerical aperture of the objective lens, the spot size can be reduced to allow reading and writing of high-density DVD disks. After experimentation, the planar integrated micro-optical pickup head of the invention preferably uses an objective lens with a numerical aperture value of 0.85 and a laser beam wavelength of 405 nm for a protection layer of the optical disk having a thickness of 0.1 mm. FIG. 9 is a chart that shows a resulting distribution of the spot size obtained with the invention, the result is obtained by modeling via the software Zemax. As shown in FIG. 9, the distribution range 90A of the spot size is smaller than the Airy Disc distribution range 90A obtained by diffraction theory. It is therefore shown that micro-optical pickup heads designed with planar optical elements can effectively read HD-DVD disks.

Figure 10:
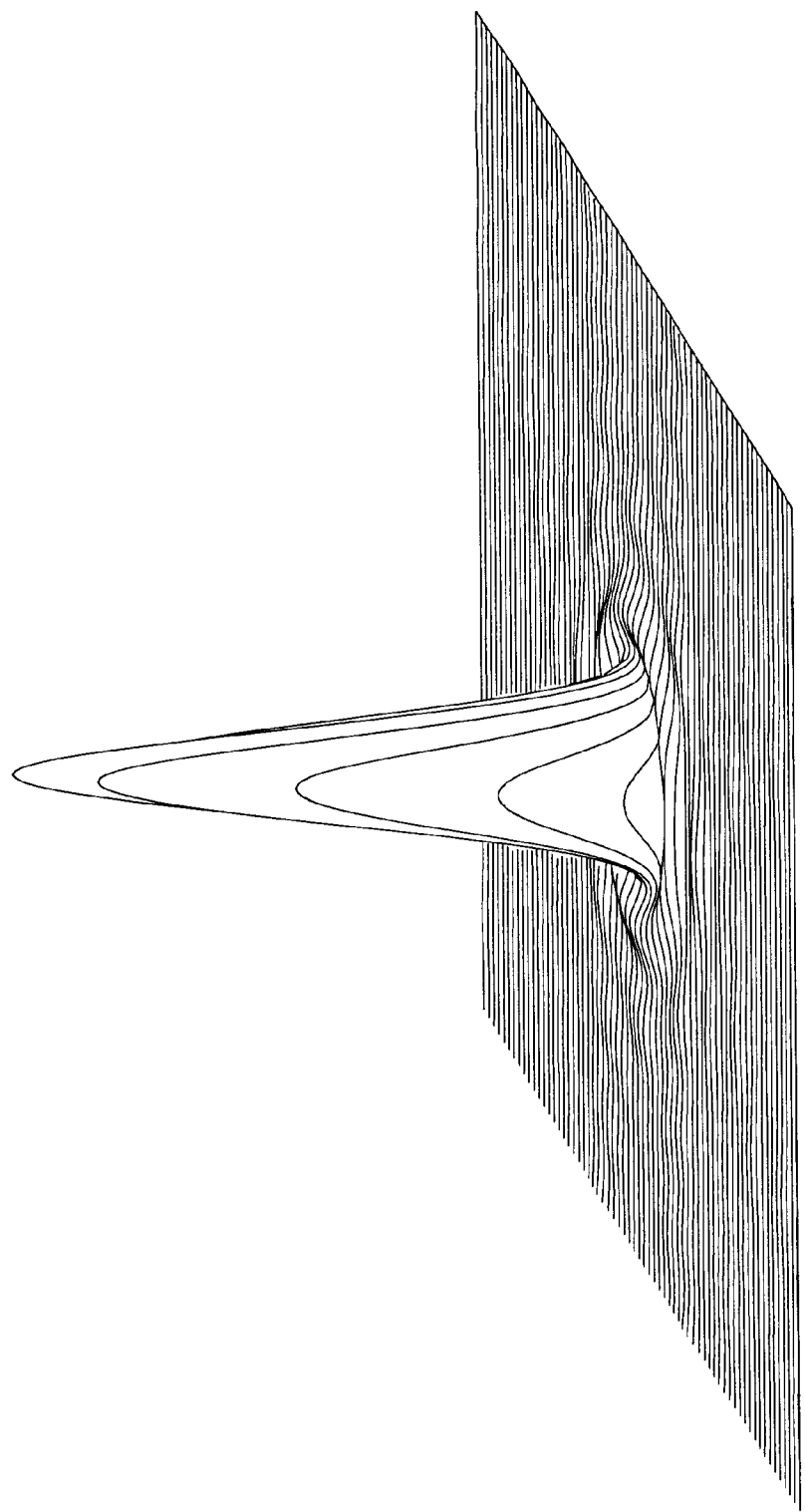
FIG. 10 is a chart showing a power distribution of the spot size obtained with the planar integral micro-optical pickup head of the invention.

With respect to the point spread function of the micro-optical head, FIG. 10 shows a power distribution of the spot size obtained with the invention. As shown in FIG. 10, the power distribution of the spot size in the invention is a symmetrical Gauss distribution similar to the conventional optical head. Therefore, the planar integrated micro-optical pickup head of the invention has a good quality spot. Furthermore, the objective lens of the invention can be replaced by a near-field optical lens, such as SIL, SNOM, etc. so that the invention can be used with near-field optical discs.

Second Embodiment

Figure 11:
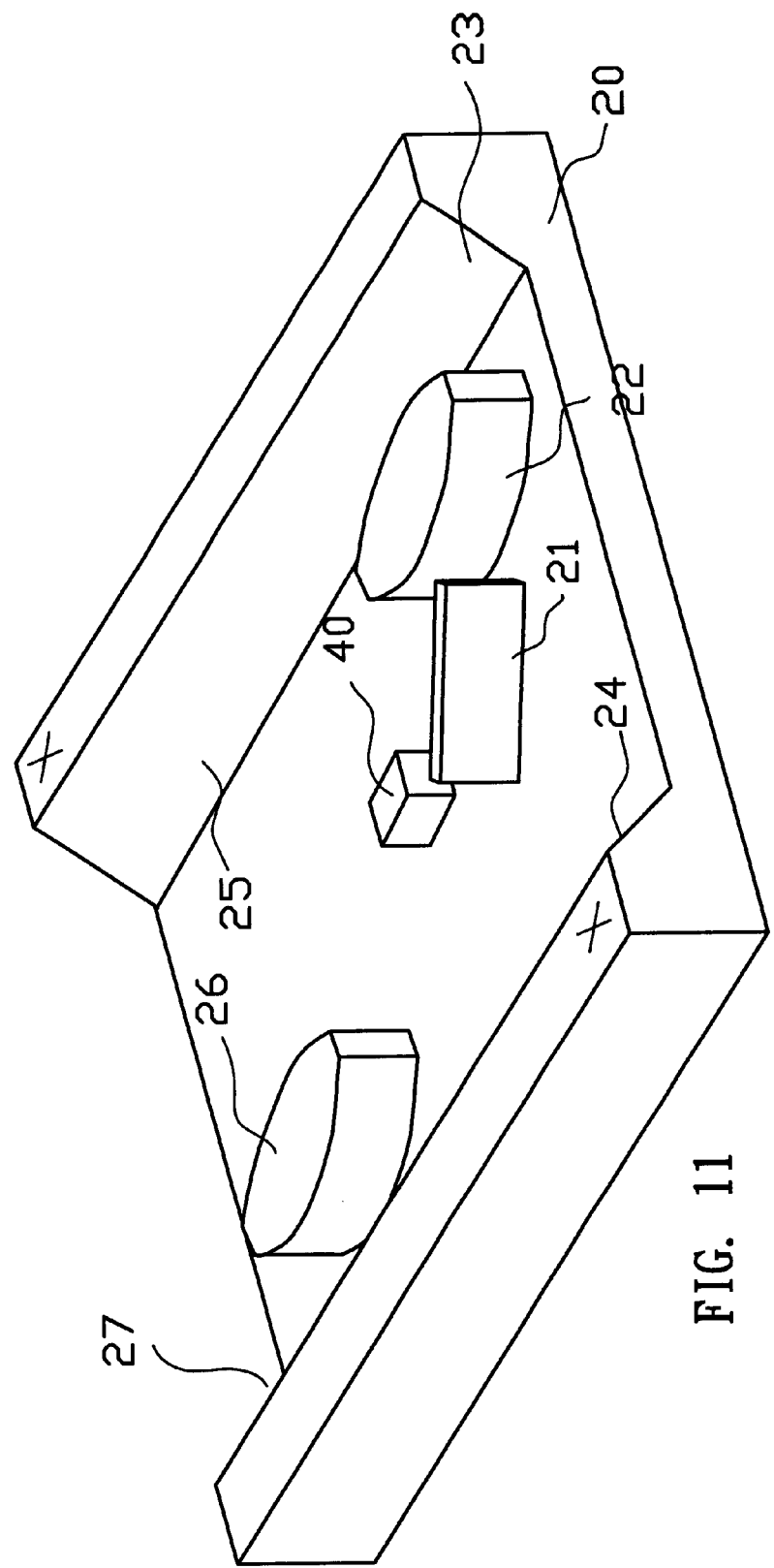
FIG. 11 is a perspective view of a lower substrate according to a second embodiment of the invention.
Figure 12:
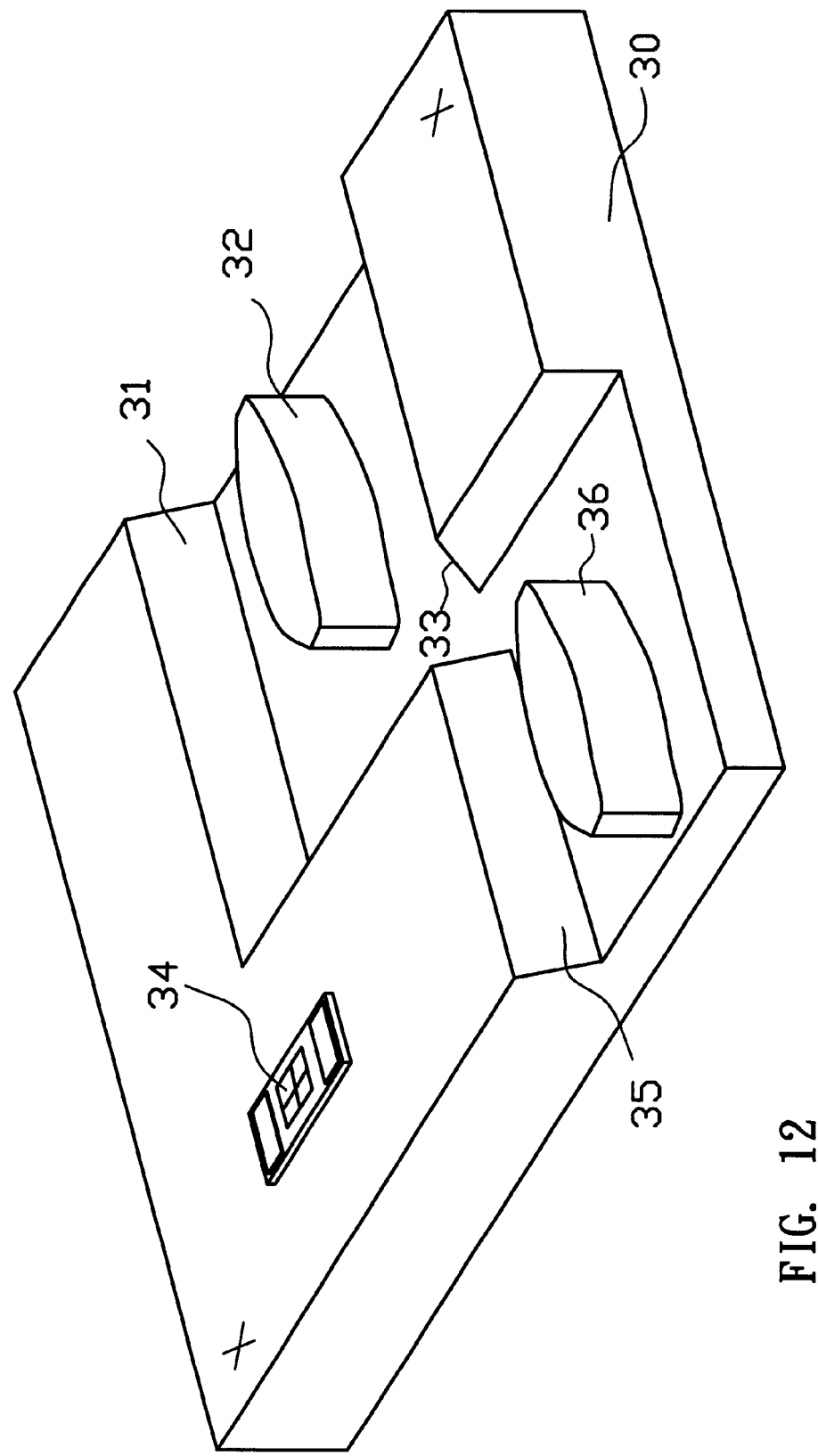
FIG. 12 is a perspective view of an upper substrate according to the second embodiment of the invention.

Referring now to FIG. 11 and FIG. 12, two perspective views schematically illustrate a lower substrate and an upper substrate according to a second embodiment of the invention. In the second embodiment, the reference numerals similar to those of the first embodiment refer to the same elements. The second embodiment differs from the first embodiment in the following elements. In the second embodiment, the objective lens 50 is formed from a set of planar objective lenses that comprises of a fifth folding mirror 25, a first planar objective lens 26, a sixth folding mirror 27, a seventh folding mirror 35, and a second planar objective lens 36. The fifth folding mirror 25, the first planar objective lens 26, and the sixth folding mirror 27 can be formed on the lower substrate 20 via a semiconductor planar fabrication process. Similarly, the seventh folding mirror 35 and the second planar objective lens 36 can be formed on the upper substrate 30 via a semiconductor planar fabrication process. Thereby, two focuses can be achieved via the two planar objective lenses. The fabrication of the optical pickup head of the second embodiment can be achieved via a method similar to the above first embodiment.

Figure 13:
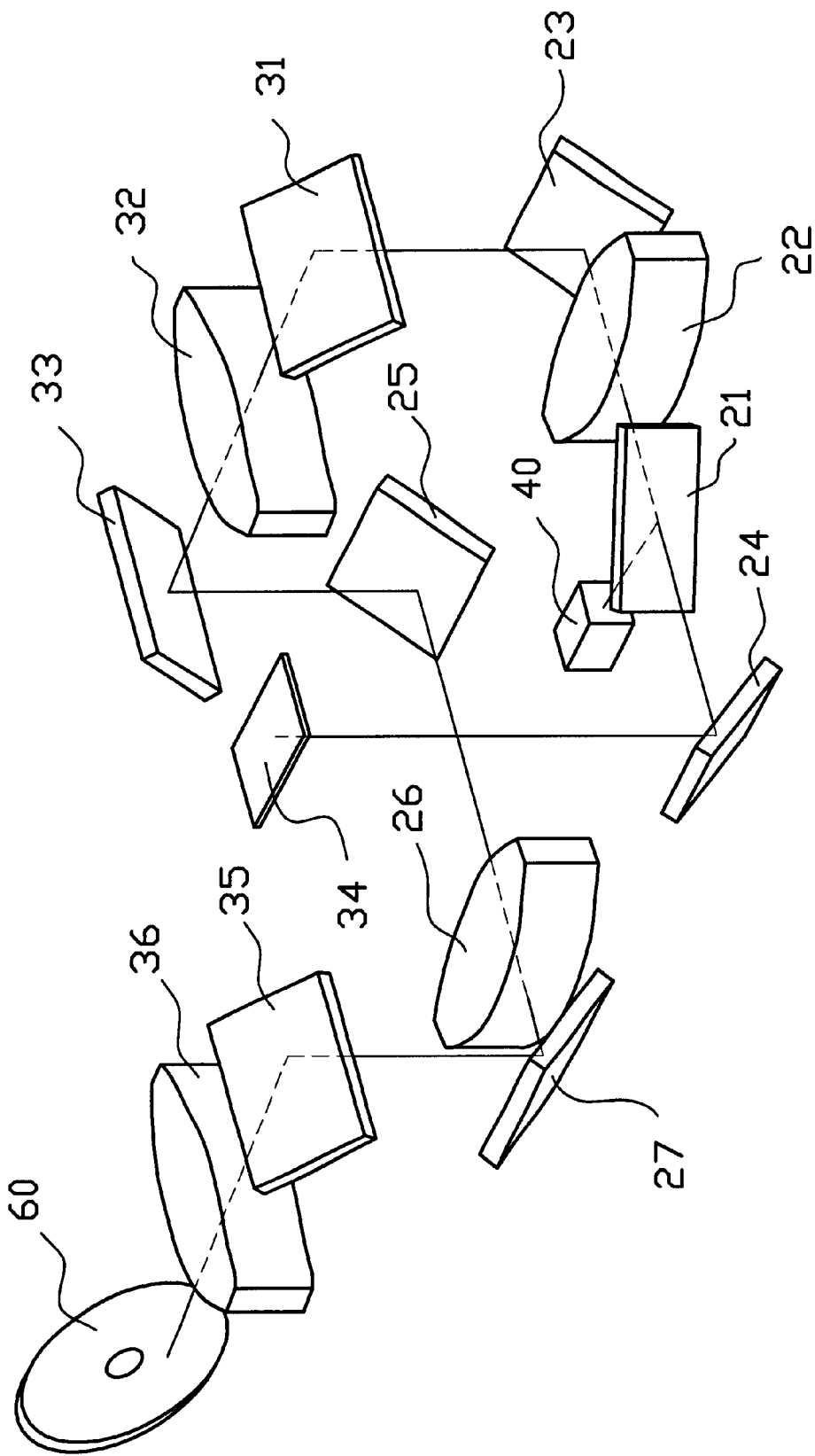
FIG. 13 is a schematic view showing a light path within a planar integral micro-optical pickup head according to the second embodiment of the invention.

Referring now to FIG. 13, a perspective view schematically illustrates a light path within the planar integrated micro-optical pickup head of the second embodiment. When a reading operation is performed, the laser source 40 emits an oval laser beam of short wavelength. The laser beam passes through the beam splitter 21 to be directed toward the first planar collimator 22. After the first planar collimator 22, the light of the oval laser beam is parallel along its long axis while the light of the laser beam along its short axis continues diverging. After the first planar collimator 22, the laser beam travels toward the first folding mirror 23 and the second folding mirror 31 to be turned 90 degrees and directed onto the second planar collimator 32. After the second planar collimator 32, the light of the oval laser beam is parallel along its short axis, the laser beam thereby becomes circular with a uniform power distribution. After the second planar collimator 32, the laser beam is reflected via the third and fifth folding mirrors 33, 25 into a horizontal laser beam. The horizontal laser beam is focused a first time through the first planar objective lens 26, then via a reflection onto the sixth and seventh folding mirrors 27, 35, the laser beam is turned 90 degrees to be focused a second time via the second planar objective lens 36. After the second focus via the second planar objective lens 36, the laser beam then is projected onto the data layer of the optical disk 60.

In the return path, the laser beam reflected from the optical disk 60 travels to the beam splitter 21. A portion of the laser beam then passes through the beam splitter 21 and is reflected via the fourth folding mirror 24 into the photo-detector 34. The photo-detector 34 then converts the light signal (including disk data signals, focus error signals, etc.) into an electrical signal to achieve the reading operation.

When a writing operation is performed, the above reading mechanism is first accomplished to find the location of the optical disk 60 where data should be written. By means of a function generator, a driving current of the laser source 40 then is adjusted to have a required variation of intensity of the laser beam. Through the above light path of the reading operation, the laser beam is focused on the data layer of the optical disk 60. Thermal actions generated by the variation of intensity of the laser beam then create different physical features on the data layer of the optical disk 60 corresponding to binary data 0 and 1. An erasure operation is very similar to the writing operation, the principal difference is that the thermal actions generated by the laser beam result in identical physical features on the data layer of the optical disk 60.

With the planar integrated micro-optical pickup head of the second embodiment, the spot size can be also favorably reduced to read and write on high-density optical disks by reducing the wavelength of the laser beam and increasing the value of the numerical aperture of the objective lens.

Application of the Invention

Figure 14:
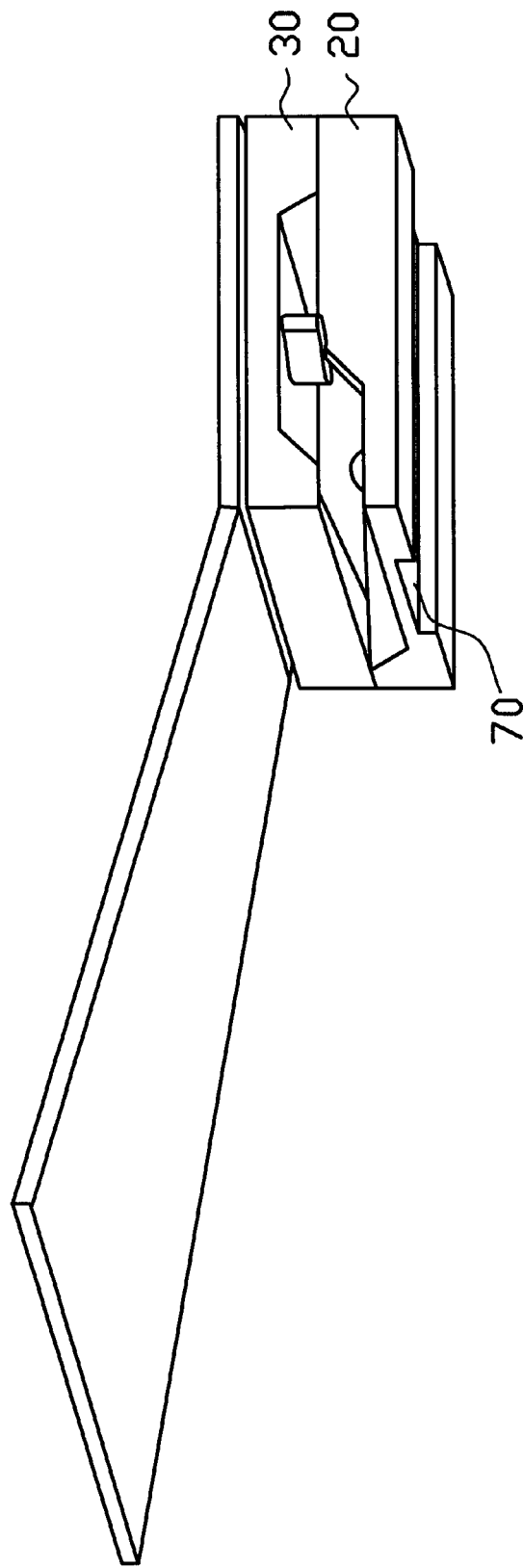
FIG. 14 is a perspective view illustrating a planar integral micro-optical pickup head of the invention used as a flying head.
Figure 15:
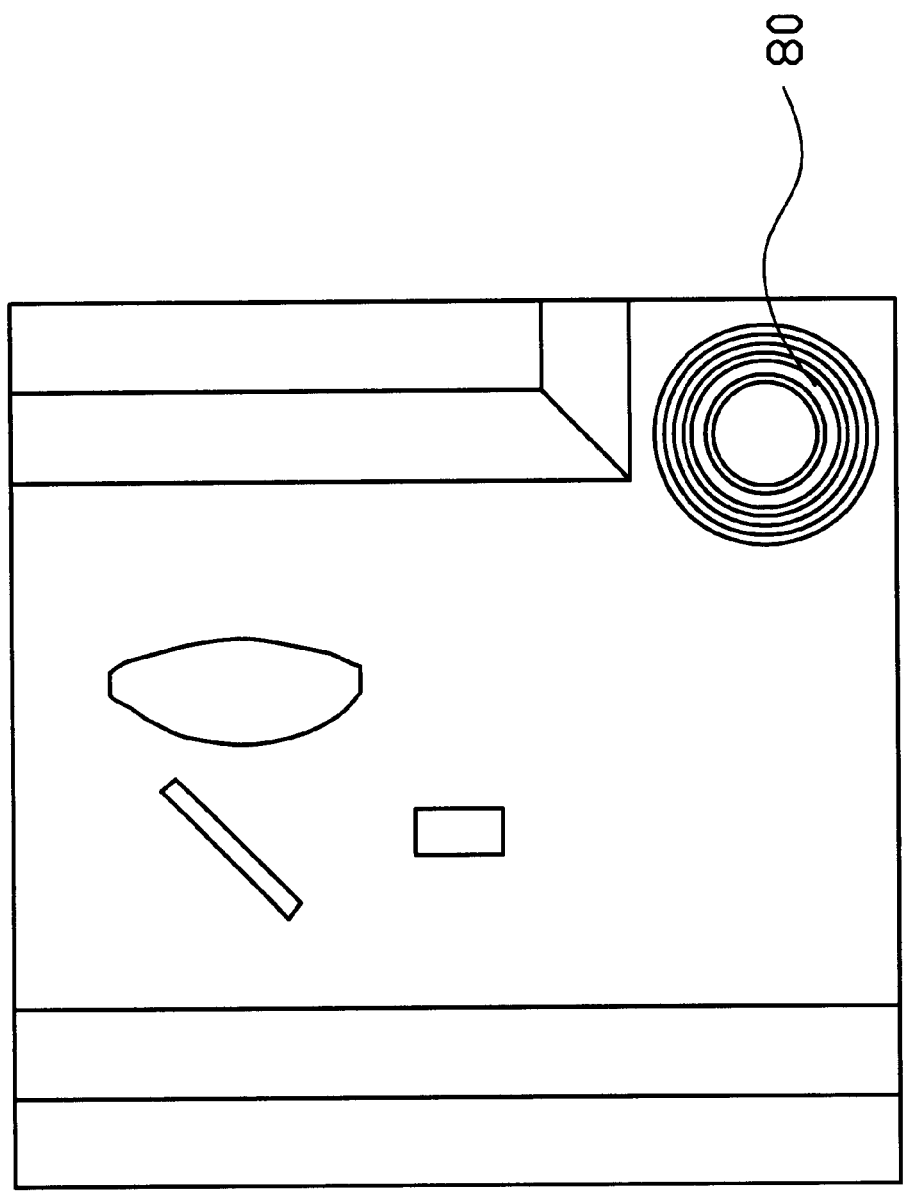
FIG. 15 is a perspective view illustrating a planar integral micro-optical pickup head of the invention used as an optical-magnetic head.

FIG. 14 and FIG. 15 are various perspective views that schematically illustrate two applications of the planar integrated micro-optical pickup head of the above embodiments of the invention. As shown in FIG. 14, a flying slot 70 can be formed on the lower substrate 20 via a semiconductor planar fabrication process to form a flying head. FIG. 15 illustrates another example where a semiconductor planar fabrication process may be performed to form a planar coil 80, thereby achieving optical-magnetic head. Furthermore, the planar integrated micro-optical pickup head can be also assembled with the hard disk flying structure to achieve focus and track course function.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A planar integrated micro-optical pickup head used to perform reading and writing operations on a disk, the pickup head comprising:

an optical assembly comprised of a lower substrate and an upper substrate, wherein the lower substrate supports a beam splitter, a first planar collimator, a first folding mirror and a fourth folding mirror, the upper substrate supports a second folding mirror, a second planar collimator, a third folding mirror, and a photo-detector, the above elements supported on the lower and upper substrates are fabricated via semiconductor planar fabrication processes;

a laser source attached on the lower substrate at a first appropriate location to provide a laser beam of short wavelength; and an objective lens mounted on the lower substrate at a second appropriate location; wherein the lower substrate and the upper substrate are aligned and attached with each other to form the planar integrated micro-optical pickup head; the laser beam emitted from the laser source travels through the optical assembly to be collimated two times into a circular laser beam, the circular laser beam passing through the objective lens to be focused and projected onto the disk; the laser beam after reflection from the disk is projected into the photo-detector to be converted into a data signal, a focus signal, and a track course error signal.

2. The pickup head of claim 1, wherein the objective lens can be replaced by a set of near field optical lenses used to read and write a near field optical disk.

3. The pickup head of claim 1, wherein the first folding mirror and the second folding mirror are 45-degrees obliquely oriented.

4. The pickup head of claim 1, wherein the objective lens can be replaced by a set of planar objective lenses, the set of planar objective lenses is comprised of a fifth folding mirror, a first planar objective lens, a sixth folding mirror, a seventh folding mirror, and a second planar objective lens, the first planar objective lens, the fifth folding mirror, and the sixth folding mirror being formed on the lower substrate via a first semiconductor planar fabrication process, the second planar objective lens and the seventh folding mirror being formed on the upper substrate via a second semiconductor planar fabrication process.

5. The pickup head of claim 1, wherein the laser beam is emitted from the laser source in an oval shape, passes through the first planar collimator to become parallel along a long axis of the oval laser beam, turns 90 degrees via reflection on the first and second folding mirrors, and is collimated a second time through the second planar collimator to form a circular and parallel laser beam.

6. The pickup head of claim 1, wherein a flying slot is formed on the lower substrate via a semiconductor planar fabrication process to form a flying head.

7. The pickup head of claim 1, wherein a coil is formed on the lower substrate via a semiconductor planar fabrication process to form an optical-magnetic head.

8. The pickup head of claim 1, further being attached to a hard disk flying structure to achieve focus and track course functions.

* * * * *